Feb. 10, 1925.
J. WEBER
DISK WHEEL
Filed April 7, 1924
1,525,479
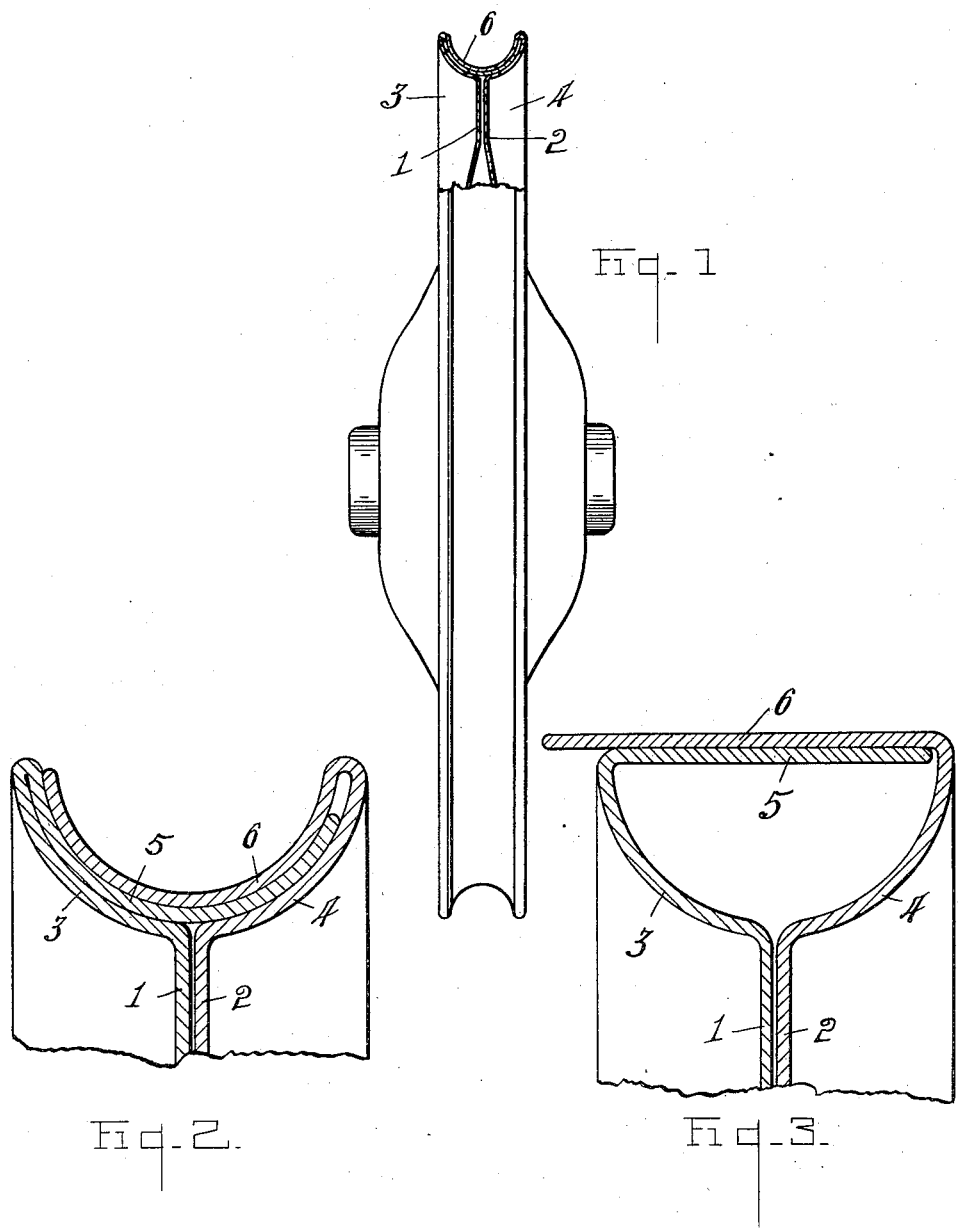

Patented Feb. 10, 1925.

1,525,479

UNITED STATES PATENT OFFICE.

JOHN WEBER, OF TOLEDO, OHIO, ASSIGNOR TO THE AMERICAN-NATIONAL COMPANY, OF TOLEDO, OHIO, A CORPORATION OF OHIO.

DISK WHEEL.

Application filed April 7, 1924. Serial No. 704,576.

*To all whom it may concern:*

Be it known that I, JOHN WEBER, a citizen of the United States, and a resident of Toledo, in the county of Lucas and State of Ohio, have invented a new and useful Disk Wheel, which invention is fully set forth in the following specification.

This invention relates to disk wheels, and particularly to the construction and manner of forming the rim portions thereof.

The object of the invention is the production of a wheel of the class described, and particularly the rim portion thereof, in a simple, rapid and efficient manner, whereby such portion is of very rigid and durable construction, thereby enhancing the commercial value of wheels of this class.

The invention is fully described in the following specification, and while in its broader aspect it is capable of embodiment in numerous forms, a preferred embodiment thereof is illustrated in the accompanying drawings, in which—

Figure 1 is an edge elevation of a wheel embodying the invention, with a portion broken away. Figure 2 is an enlarged cross section of the rim portion of the wheel, and Figure 3 is an enlarged fragmentary cross section of the wheel with the members thereof assembled, and before the rim extensions have been rolled or forced down into the rim.

Referring to the drawings, 1 and 2 designate the opposed sheet metal disks forming the body or web portion of the wheel. These disks terminate at their outer edges in the outwardly curved or arc portions 3 and 4, respectively, which form the respective outer sides of the wheel rim. The outer edges of the rim portions 3 and 4 terminate in extensions 5 and 6, respectively, which are first turned in in lapping relation to each other in cylindrical form, and are then rolled down into the rim against the arcuate portions 3 and 4 to form a substantially semi-circular rim of three-ply construction. This construction renders the rim very strong and durable and the interlocking of the extensions 5 and 6 prevents lateral separation of the two rim members, while the outer extension 6 forms a smooth semi-circular seat for a tire. The extension 5 is preferably of a length to adapt it when in cylindrical form to substantially span the space between the outer edges of the two rim portions 3 and 4, and the extension 6 is preferably of greater length than such space, as shown in Figure 3, to adapt it, when drawn down into the rim cavity, to extend substantially from one edge to the other of the cavity.

In practice the two sheet metal members of the wheel are formed with their rim portions shaped as shown in Figure 3, so that the members thereof may be assembled with their rim extensions 5 and 6 telescoped. The rim is then completed, preferably by rolling the extensions 5 and 6 closely down into the semi-circular cavity formed by the rim portions 3 and 4, the inner extension 5 bearing closely against said portions and the outer extension 6 bearing closely against the extension 5. This not only forms a strong reinforced rim having a smooth seat for a tire, but also gives the edges of the rim a rounded formation to prevent cutting a tire.

The wheel is intended for use more particularly in connection with juvenile vehicles for holding a solid tire, but is not restricted to such use.

I wish it understood that my invention is not limited to any particular form, arrangement or construction of the parts or manner of shaping the same, as it is capable of numerous modifications without departing from the spirit of the claims.

Having thus described my invention, what I claim as new and desire to secure by Letters Patent is:

1. A disk wheel having opposed disk members forming oppositely extending arcuate rim portions with edge extensions lapping each other and cooperating with the rim portions to form a substantially semi-circular three-ply rim.

2. A disk wheel having opposed disk members terminating in oppositely projecting arcuate rim portions having outer edge extensions which fit one over the other within the arcuate rim portions.

3. A disk wheel having opposed disk members terminating in oppositely projecting rim portions forming a rim cavity and having outer edge extensions doubled down within the cavity in interlocking relation.

4. A disk wheel having opposed disk members terminating in oppositely extending rim portions cooperating to form a substantially semi-circular rim and having outer edge extensions doubled closely down within the rim one over the other to reinforce the rim, the two extensions interengaging to prevent lateral separation of the rim portions.

5. A disk wheel having opposed disk members terminating in oppositely extending rim portions cooperating to form a substantially semi-circular rim and having outer edge extensions doubled closely down within the rim one over the other to reinforce the rim, the two extensions interengaging to prevent lateral separation of the rim portions and the outer extension forming an arcuate tire seating surface substantially from one edge to the other of the rim cavity.

In testimony whereof, I have hereunto signed my name to this specification.

JOHN WEBER.